(12) United States Patent
Ganesan et al.

(10) Patent No.: US 11,126,420 B2
(45) Date of Patent: Sep. 21, 2021

(54) COMPONENT FIRMWARE UPDATE FROM BASEBOARD MANAGEMENT CONTROLLER

(71) Applicant: Dell Products L.P., Round Rock, TX (US)

(72) Inventors: Vaideeswaran Ganesan, Bangalore (IN); Suren Kumar, Vellore (IN); B. Balaji Singh, Bangalore (IN); David Keith Chalfant, Round Rock, TX (US); Swamy Kadaba Chaluvaiah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 16/243,050

(22) Filed: Jan. 8, 2019

(65) Prior Publication Data

US 2020/0218527 A1 Jul. 9, 2020

(51) Int. Cl.
*G06F 9/44* (2018.01)
*G06F 8/65* (2018.01)
*G06F 1/24* (2006.01)
*G06F 13/42* (2006.01)
*G06F 13/16* (2006.01)
*G06F 9/4401* (2018.01)

(52) U.S. Cl.
CPC ............... *G06F 8/65* (2013.01); *G06F 1/24* (2013.01); *G06F 13/1668* (2013.01); *G06F 13/4221* (2013.01); *G06F 9/4401* (2013.01); *G06F 2213/0024* (2013.01)

(58) Field of Classification Search
CPC .... G06F 8/65; G06F 13/1668; G06F 13/4221; G06F 1/24; G06F 13/1663; G06F 13/668; G06F 2213/0024; G06F 9/4401
USPC ........................................................ 717/168
See application file for complete search history.

(56) References Cited

U.S. PATENT DOCUMENTS

| | | | |
|---|---|---|---|
| 6,434,696 | B1 | 8/2002 | Kang |
| 6,718,461 | B1 | 4/2004 | Ewertz |
| 6,883,091 | B2 | 4/2005 | Morrison et al. |
| 7,409,537 | B2 | 8/2008 | Tsang |
| 7,568,195 | B2 | 7/2009 | Markley et al. |
| 7,584,467 | B2 | 9/2009 | Wickham et al. |
| 8,412,816 | B2 | 4/2013 | Jreij et al. |

(Continued)

OTHER PUBLICATIONS

Title: BIOS Protection Guidelines for Servers; author: Andrew REgenschield, published on Aug. 2014.*

(Continued)

*Primary Examiner* — Chameli Das
(74) *Attorney, Agent, or Firm* — Norton Rose Fulbright US LLP

(57) ABSTRACT

A baseboard management controller (BMC) of an information handling system may notify an operating system of the information handling system of receipt of a firmware update for a PCI component. The operating system of an information handling system may receive a notification from a BMC of the information handling system, via a basic input/output system (BIOS), of the information handling system that the BMC has received the firmware update. The operating system may halt traffic to the PCI component for which an update has been received, and the update may be applied to the component.

20 Claims, 7 Drawing Sheets

(56) References Cited

U.S. PATENT DOCUMENTS

| | | | |
|---|---|---|---|
| 9,405,526 B2 | 8/2016 | Thapar et al. | |
| 9,804,901 B2* | 10/2017 | Gambardella | H04L 67/34 |
| 9,940,123 B1* | 4/2018 | Ayoub | G06F 8/656 |
| 10,628,176 B1* | 4/2020 | Santharam | G06F 9/4401 |
| 10,860,308 B1* | 12/2020 | Kulchytskyy | G06F 21/572 |
| 2002/0073304 A1* | 6/2002 | Marsh | G06F 8/65 |
| | | | 713/1 |
| 2005/0223209 A1 | 10/2005 | Chang | |
| 2007/0088974 A1* | 4/2007 | Chandwani | G06F 11/0781 |
| | | | 714/6.11 |
| 2009/0187694 A1* | 7/2009 | Baba | G06F 13/4022 |
| | | | 710/316 |
| 2011/0119474 A1* | 5/2011 | Singh | G06F 8/65 |
| | | | 713/2 |
| 2012/0144231 A1* | 6/2012 | Yagi | G06F 11/1441 |
| | | | 714/4.5 |
| 2013/0039443 A1* | 2/2013 | Garaschenko | H04L 12/10 |
| | | | 375/316 |
| 2016/0011646 A1* | 1/2016 | Maity | G06F 1/3287 |
| | | | 713/324 |
| 2016/0070625 A1* | 3/2016 | Allu | G06F 11/0709 |
| | | | 714/4.11 |
| 2016/0283221 A1* | 9/2016 | Kochar | G06F 9/45558 |
| 2016/0364243 A1* | 12/2016 | Puthillathe | G06F 9/4406 |
| 2017/0177457 A1* | 6/2017 | Swanson | G06F 11/073 |
| 2018/0165101 A1 | 6/2018 | Bulusu et al. | |
| 2018/0217880 A1* | 8/2018 | Pathak | G06F 9/445 |
| 2019/0042506 A1* | 2/2019 | Devey | H04L 41/0816 |
| 2019/0179628 A1* | 6/2019 | Bulusu | G06F 8/656 |

OTHER PUBLICATIONS

A framework to secure peripherals at runtime, author: F Zhang et al., published on 2014.*

Title: PCI Express® System Interconnect Software Architecture for x86-based Systems, author: K Kong et al., published on 2007.*

Title: Performance impact of using ESP to implement VMMC firmware, author: S kumar et al, published on 2002.*

* cited by examiner

COMPONENT FIRMWARE UPDATE FROM BASEBOARD MANAGEMENT CONTROLLER

FIELD OF THE DISCLOSURE

The instant disclosure relates to updates for components of information handling systems. More specifically, portions of this disclosure relate to updating of information handling system component firmware from a baseboard management controller (BMC).

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users may reboot information handling systems for a variety of reasons. For example, a user may power down an information handling system to save energy when the system is not in use. As another example, a user may reboot an information handling system in order to install hardware, firmware, and/or software updates.

When an information handling system is powered on, the system executes a booting process to initialize hardware and software for use. For example, information handling systems may load and initialize drivers, inventory hardware components, apply hardware, firmware, and software updates, and load and boot an operating system (OS) of the information handling system. Booting and/or rebooting an information handling system may require a substantial amount of time, sometimes reaching or even exceeding 10 minutes, which can negatively impact a user experience. The boot time can be particularly long for information handling systems with large amounts of hardware, such as servers. Often information handling systems include multiple components that must be inventoried, initialized, and allocated resources prior to booting an operating system. Extended booting times may cause users to delay rebooting, even when system updates are ready for installation, which may increase the risk of system failures or security breaches.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Installation and reboot time of firmware updates for components of an information handling system may be reduced by installing the firmware updates from a baseboard management controller (BMC) of the information handling system. Reboot time may be further reduced by facilitating communication between the BMC and an operating system of the information handling system at runtime to inform the operating system that a firmware update has been received. When informed of receipt of a firmware update, the operating system may initiate a process to halt traffic to the component so that the firmware update may be applied and to save information regarding the component, such as register settings for the component, that may be used in reducing reboot time of the information handling system when applying the update to the component.

A baseboard management controller may notify an operating system of receipt of a firmware update for a peripheral component interconnect (PCI) component of the system, allowing the operating system to apply the PCI component firmware update. In some cases, the operating system may be able to apply the PCI component without requiring a reboot of the information handling system, while in others the information handling system may be able to reboot with a reduced boot time, such as by bypassing one or more basic input/output system (BIOS) Power-On Self-Test (POST) operations, to apply the firmware update to the component. A method for updating component firmware may begin with receipt of a notification from a BMC, via a BIOS of the information handling system, of receipt of an update for a firmware of a PCI component, by the BMC. For example, a BMC, may include a remote access controller, such as an Integrated Dell Remote Access Controller. The BMC may receive a firmware update, at runtime of an operating system of the information handling system, and may notify a BIOS of the information handling system, such as by triggering of a system management interrupt (SMI), that a firmware update has been received. The BMC may store an identifier for the component in an internal memory. The BIOS may retrieve an identifier for the component for which the firmware update has been received from the BMC and may save the identifier for the PCI component to a memory of the information handling system, such as a non-volatile random access memory (NVRAM). The BIOS may then notify the operating system of the information handling system, such as by generating a system control interrupt (SCI), that the BMC has received a component firmware update.

When the operating system of the information handling system has been notified that the BMC has received a component firmware update, the operating system may halt traffic to the PCI component to which the firmware update applies. For example, the operating system may receive the notification of the firmware update from the BIOS and may retrieve the identifier for the component to be updated from the NVRAM. The operating system may then halt traffic to the identified PCI component so that the update can be applied. The operating system may also save register settings and other configuration information for the identified PCI component to NVRAM.

After the operating system has halted traffic to the PCI component, the information handling system may apply the firmware update to the PCI component. In some embodiments, the information handling system may apply the firmware update to the component without rebooting and may reset the component, restoring register and configuration settings of the component after applying the firmware update. In other embodiments, the information handling system may, in some embodiments, reboot after halting traffic to the PCI component. While the information handing system is rebooting, for example, during a quick boot, the information handling system may reset the component, applying the firmware update to the component. For example, the BIOS may initiate a component reset after the BMC has finished installing the firmware update to apply the firmware update to the component. The BIOS may also access register settings and other configuration information for the PCI component that was stored by the operating system and may restore the register settings and configuration after resetting the PCI component. After the PCI component is reset, the information handling system may restore traffic to the PCI component.

An information handling system may include a processor for performing the steps described herein. Furthermore, an information handling system may include a memory, such as an NVRAM, for storing instructions, a list of components to be reset, register settings for reset components, and/or other information required or useful in resetting components. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
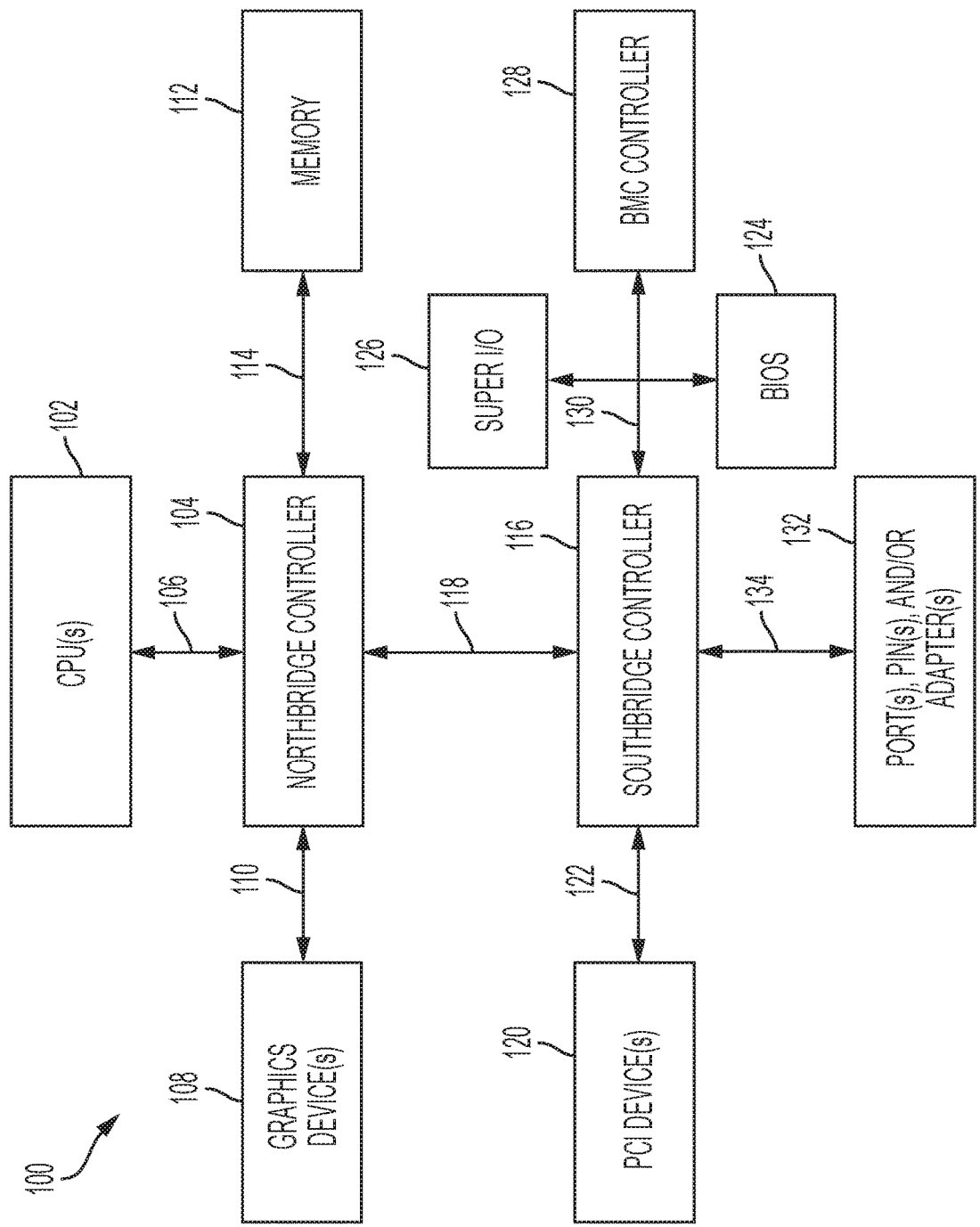
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory. In some embodiments memory 112 may include NVRAM. In other embodiments, NVRAM may be separately included in or coupled to CPU 102.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130. Super I/O controller 126 may combine interfaces for a variety of lower bandwidth or low data rate devices. Those devices may include, for example, floppy disks, parallel ports, keyboard and mouse, temperature sensor and fan speed monitoring, etc.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. The NVRAM of the BIOS may store a boot flag and instructions for performing a quick boot or a detailed boot based on a status of the boot flag. In some embodiments, the NVRAM of the BIOS may also store a boot map and booting information for performing a quick boot. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC 128 may include non-volatile memory having program instructions stored thereon that are usable by CPU(s) 102 to enable remote management of IHS 100. For example, BMC 128 may enable a user to discover, configure, and manage BMC 128, setup configuration options, resolve and administer hardware or software problems, etc. Additionally or alternatively, BMC 128 may include one or more firmware volumes, each volume having one or more firmware files used by the BIOS' firmware interface to initialize and test components of IHS 100. BMC 128 may include an integrated Dell Remote Access Controller (iDRAC) and may communicate with a remote client, such as a server or other remote information handling system, to receive firmware updates for information handling system components, such as PCI components 220.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
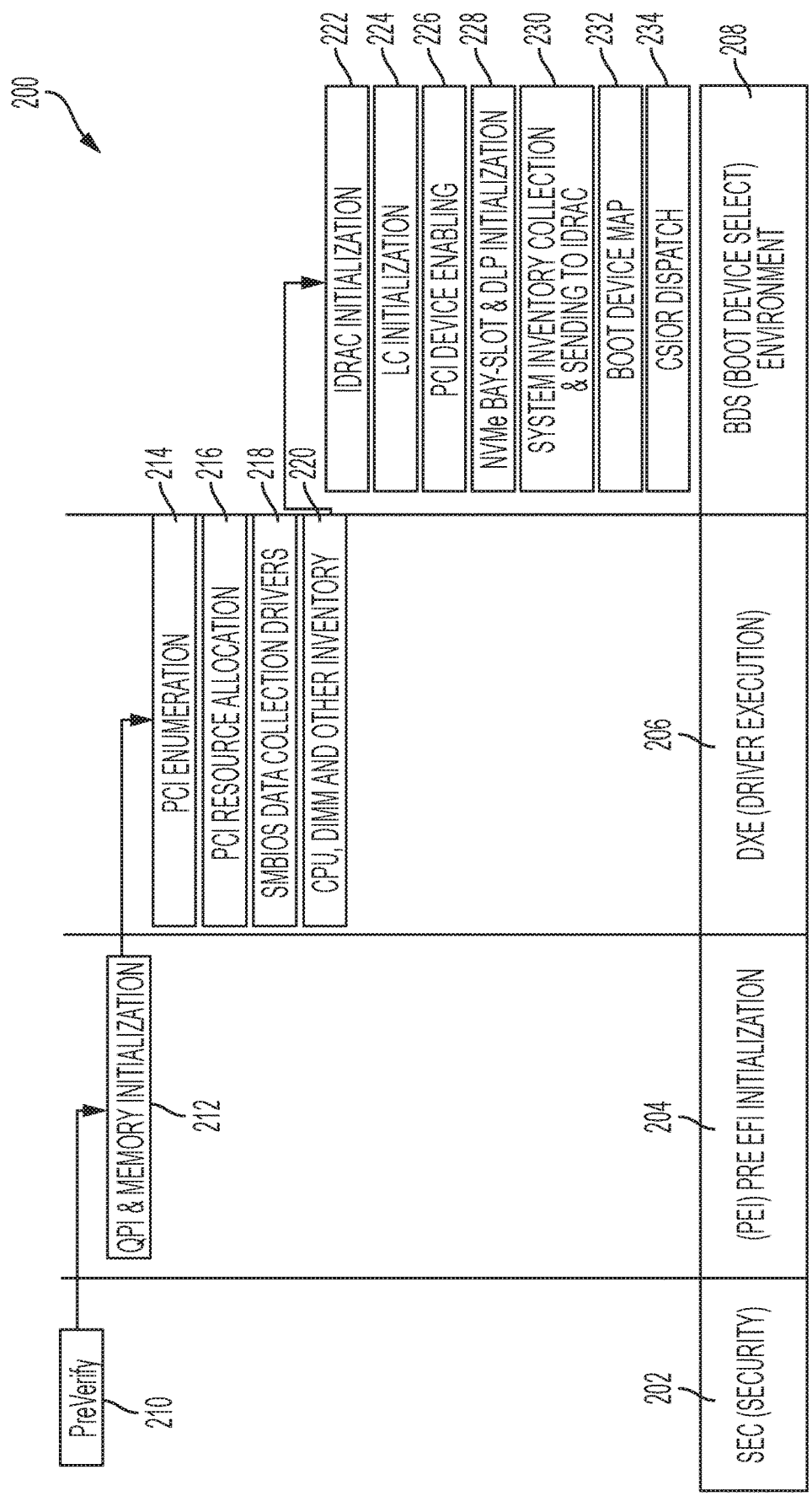
FIG. 2 is a process diagram of example information handling system detailed boot operation according to some embodiments of the disclosure.

When an information handling system is powered up, for example during a rebooting process, the information handling system may begin a booting process wherein a BIOS/UEFI may initialize and configure hardware and firmware, prepare the information handling system for booting of the operating system, and boot the operating system. An example process diagram 200 of a detailed booting process for an information handling system is shown in FIG. 2. The detailed booting process may allow for a full inventory of hardware and firmware, including installation of hardware and firmware updates that may have been downloaded following a prior booting process. After an IHS is powered on, the IHS may enter a security phase 202 where the BIOS/UEFI may perform a pre-verify operation 210 to examine the security certificate and verify that the device is ready for secure operation.

After the security phase 202, the IHS may enter a pre-extensible firmware interface initialization phase 204, wherein the IHS may perform Quick Path Interconnect (QPI) and memory initialization 212. During the Quick Path Interconnect and memory initialization 212, among other tasks the information handling system may check a boot flag to determine whether to perform a quick boot, as discussed with respect to FIG. 3, or detailed boot, as discussed with respect to FIG. 2, based on whether a reboot requires installation of a hardware or firmware update. Alternatively, the information handing system may check the boot flag after performing a Quick Path Interconnect and memory initialization 212. After the Quick Path Interconnect and memory are initialized, the IHS may enter a driver execution phase 206.

During the driver execution phase 206, the information handling system may perform Peripheral Component Interconnect (PCI) enumeration 214 to detect, configure, and/or initialize any devices connected to and/or integrated in the information handling system. After performing PCI enumeration 214, the IHS may perform PCI resource allocation 216 to allocate resources, such as memory, to the detected devices. The IHS may then execute 218 system management basic input/output system (SMBIOS) data collection drivers before inventorying 220 the CPU, dual in-line memory modules (DIMMs), and/or other system elements. After the IHS has completed the driver execution phase 206, the IHS may proceed to a boot device select (BDS) environment phase 208 for selection of a boot device.

The IHS may perform integrated remote access controller initialization 222, such as initialization of a BMC. One example of a BMC may include an integrated Dell Remote Access Controller (iDRAC). The IHS may then perform line card (LC) initialization 224 and may enable PCI devices 226. The IHS may then perform non-volatile memory express (NVMe) bay-slot and data loss prevention (DLP) initialization 228. The IHS may then collect system inventory and send the system inventory to the integrated remote access controller 230. The IHS may map the boot device 232 and may perform a dispatch 234 of collected system inventory on restart (CSIOR). The information handling system may boot the operating system from the mapped boot device.

In order to facilitate a quick boot, the information handling system may save information from the detailed booting process in NVRAM. For example, the information handling system may save PCI resource allocation 216 information, SMBIOS data collection driver 218 information, CPU and DIMM and other system component inventory 220 information, PCI device enablement 226 information, a boot device map 232, and/or other information gathered during the booting process in a NVRAM of the information handling system. The information handling system may then access saved boot information during a quick boot to bypass one or more steps corresponding to portions of the saved and reusable boot data that are performed during a detailed boot.

Figure 3:
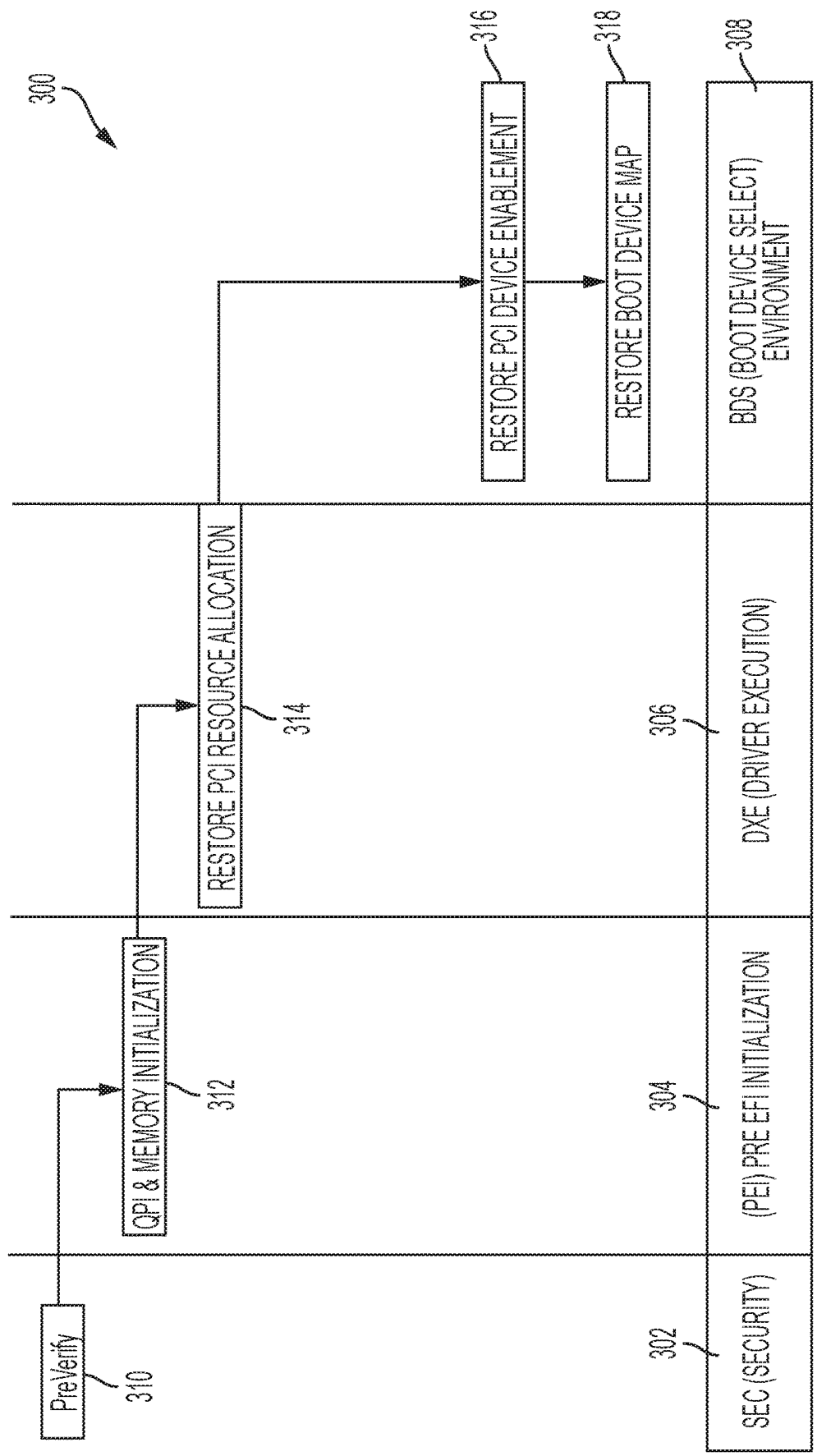
FIG. 3 is an illustration of an example information handling system quick boot operation according to some embodiments of the disclosure.

As one example, when an information handling system is booted without installation of any firmware or hardware updates, the information handling system may perform a quick boot to reduce booting time and enhance a user experience. For example, when an information handling system is rebooted for installation of a software update, without any firmware or hardware updates, the information handling system may engage in a quick boot when restarting the system. Alternatively or additionally, an information handling system may engage in a quick boot when the system is shut down by a user, without any hardware or firmware updates set for installation, and powered up by the user at a later time. An example quick boot process 300 is shown in FIG. 3. When an information handling system is powered on, it may initialize a booting process by entering a security phase 302. In the security phase 302, the information handling system may perform a pre-verify operation 310 to examine the security certificate and verify that the information handling system is ready for secure operation. The information handling system may then enter a pre-extensible firmware interface initialization phase 304 where it may perform QPI and memory initialization 312. During or following the QPI and memory initialization 312, the information handling system may determine whether to perform a quick boot or a detailed boot. For example, the information handling system may check a boot flag stored in NVRAM to determine whether installation of hardware or firmware updates is required.

If installation of hardware or firmware updates is not required, the information handling system may bypass a variety of steps performed in a quick booting process such as BIOS POST operations and/or mapping of a boot device. An advanced configuration and power interface (ACPI) driver may include functionality to restart the kernel during a quick boot, while bypassing a variety of BIOS POST operations. The ACPI driver may be configured to interact with the NVRAM boot flag to determine if a hardware or software update is required. An ACPI register reset may also be initiated when installation of a software update includes modification of a device configuration or one or more drivers. For example, after QPI and memory initialization 312 is performed, the information handling system may enter a driver execution (DXE) phase 306. During the driver execution phase, instead of performing PCI enumeration, allocating PCI resources, executing SMBIOS data collection drivers, and inventorying CPUs DIMMs and other system components, as would be performed in a detailed boot, the information handling system may restore 314 a PCI resource allocation from an NVRAM storage location. For example, the information handling system may restore 314 a PCI resource allocation that was stored in NVRAM during a prior boot, such as the example detailed boot of FIG. 2. The information handling system may also restore SMBIOS data collection driver information and inventory information for CPUs, DIMMs, and other system components. The information handling system may then enter a boot device select (BDS) phase 308. During the boot device select phase 308, instead of performing BMC initialization, such as iDRAC initialization, LC initialization, NVMe bay slot and DLP initialization, system inventory collection and transmittal to the iDRAC, and CSIOR dispatch as performed during a detailed boot, the information handling system may restore system information from NVRAM. The information handling system may restore 316 PCI device enabling information and may enable PCI devices based on the restored information. In some embodiments, the information handling system may reset PCI devices for which firmware updates have been installed, while restoring operation of PCI devices that are not updated without resetting such devices. In other embodiments, the information handling system may reset devices, such as PCI devices, that caused a crash of an operating system of the information handling system while restoring operation of devices that are not running the crashed firmware. The information handling system may then restore 318 a boot device map stored in NVRAM and may proceed to boot an operating system of the information handling system. For example, the information handling system may restore PCI device enabling information and a boot device map that were stored in NVRAM during the prior detailed boot process. In some embodiments, the boot device map that is restored may be a last known good map of boot devices. Although certain steps are shown as omitted from the detailed boot of FIG. 2 from the quick boot of FIG. 3 other combinations of steps from FIG. 2 may be omitted in the quick boot of FIG. 3.

Figure 4:
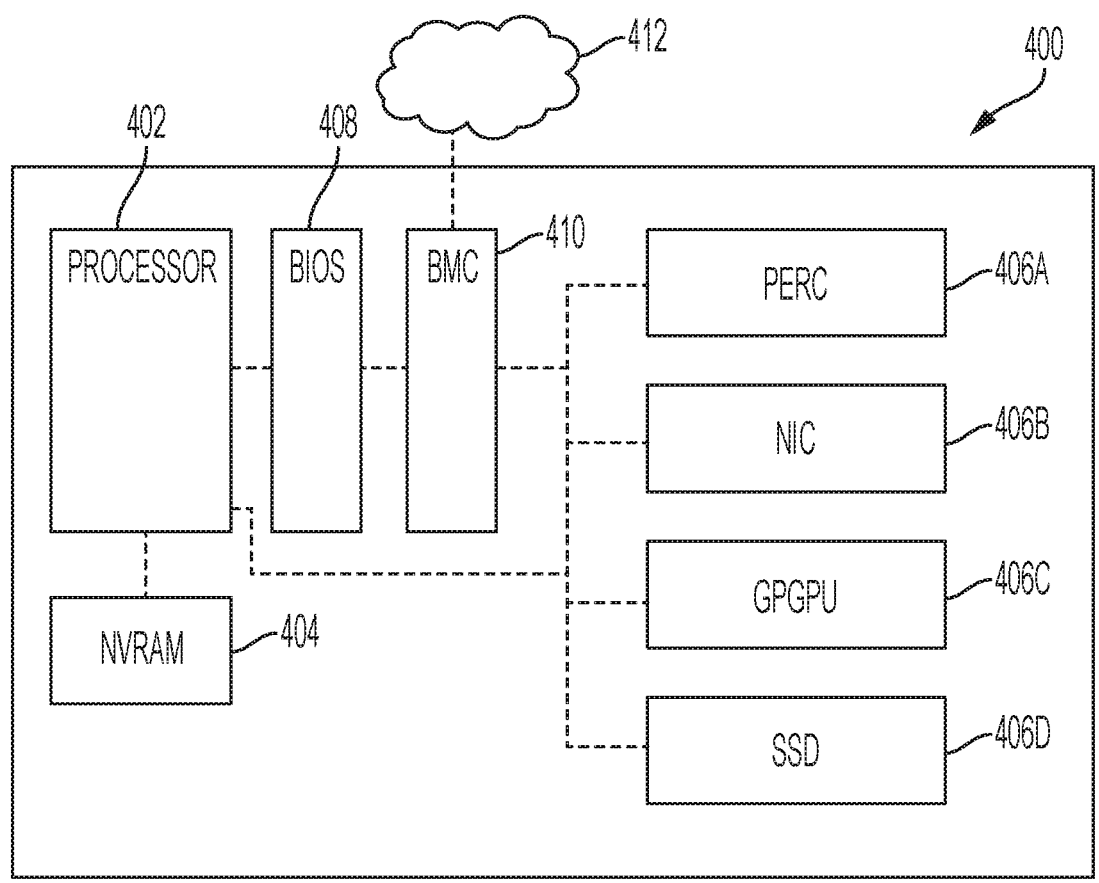
FIG. 4 is a block diagram of an example information handling system including a plurality of PCI components according to some embodiments of the disclosure.

An information handling system may include a plurality of PCI components. Firmware for PCI components may, from time to time, be updated to enhance stability, remove bugs, and/or enhance functionality. An example information handling system 400 is shown in FIG. 4. An information handling system 400 may include a processor 402 and an NVRAM 404. An information handling system 400 may also include a variety of PCI devices 406A-D, such as a PowerEdge Redundant Array of Independent Disks (RAID) Controller (PERC) 406A, a network interface controller (NIC) 406B, a general-purpose graphics processing unit (GPGPU) 406C, and a solid state drive (SSD) 406D. When a firmware update is received by information handling system 400 for a PCI device, such as PERC 406A, the information handling system may begin installing the firmware update. When installation of the update has reached a stage requiring a reboot of the information handling system 400 for application of the firmware to the PERC 406A, the PERC 406A may be logged in a PCI reset queue of the NVRAM 404. Furthermore, register settings for logged PCI components may be stored in NVRAM and may be loaded by the BIOS when resetting PCI components. The next time the information handling system is rebooted, the system may reset the PERC 406A and may then restore the saved register settings for the PERC 406A.

An information handling system 400 may also include a BIOS 408 and a BMC 410. The BIOS 408 may perform tasks such as booting the information handling system 400. The BMC 410 may include firmware libraries for system components, and may, in some embodiments, include an iDRAC. The BMC may receive firmware updates for system components, such as PCI components 406A-D, over a side-band connection. The BMC may receive component firmware updates over a network 412. For example, the BMC may receive firmware updates over the internet from a remote client, such as a server or other information handling system. The BMC 410 may be connected to the BIOS 408 to notify the BIOS when a firmware update is received. The BMC 410 may include an internal memory for storing firmware updates and identifiers for components for which firmware updates have been received. The BIOS 408 may be connected to a processor 402 to notify an operating system when a firmware update is received. The BIOS 408 may be further connected to NVRAM 404 to store an identifier for a component for which a firmware update has been received. For example, the BIOS 408 may retrieve the component identifier from the memory of the BMC 410 and may store the identifier in the NVRAM 404. In some embodiments, the BIOS 408 may store the identifier in a PCI device reset queue of the NVRAM 404. Thus, the operating system may be informed, via the BIOS 408, when a BMC 410 receives a firmware update for a PCI component. The operating system may halt traffic to the identified component, such as PERC 406A. In some embodiments, the operating system may receive a user instruction may trigger a reboot of the information handling system or may automatically reboot, so that the BMC 410 and/or BIOS 408 may reset and apply the firmware update to the component.

Figure 5:
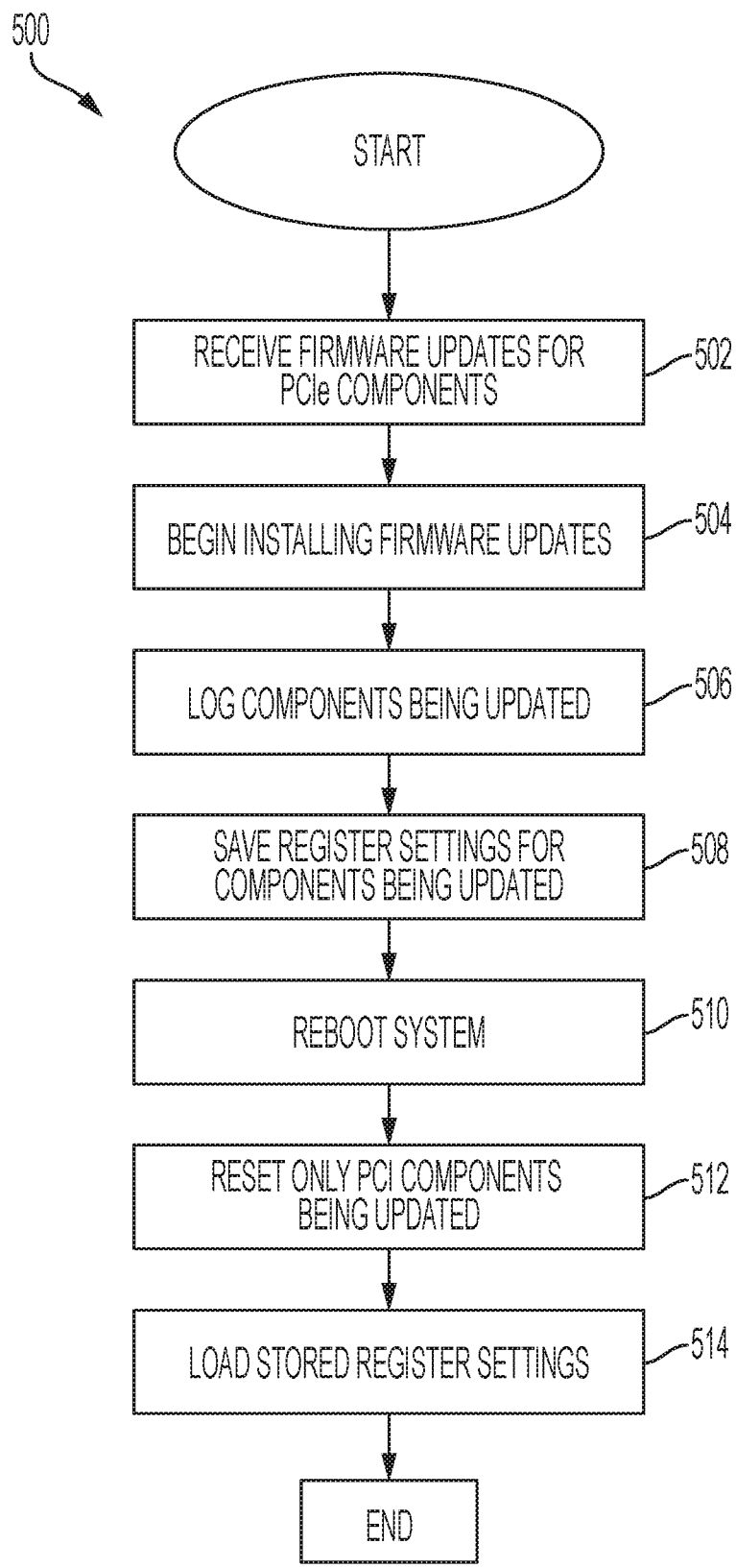
FIG. 5 is a flow chart of an example method for updating PCI component firmware according to some embodiments of the disclosure.

Information handling systems may include multiple PCI components, for which firmware updates may be received from time to time. For example, a remote server may push firmware updates for PCI components. Component firmware updates may also be downloaded by request or copied from local media. Installation of firmware updates for PCI components may require resetting of PCI components to apply the firmware updates. In some cases, application of the firmware updates may require a reboot of an information handling system. An information handling system may perform a quick boot and may reset only PCI devices for which firmware updates are being installed in order to reduce boot time. A method 500 for resetting PCI components with updated firmware is shown in FIG. 5. The method 500 may begin, at step 502, with receipt of one or more firmware updates for one or more PCIe components. For example, an information handling system may receive a plurality of firmware updates for a plurality of PCIe components.

After a firmware update is received, an information handling system may install the firmware update, at step 504. For example, an information handling system may receive a first firmware update and may begin installing the first firmware update. Subsequently, the information handling system may receive a second firmware update and may begin installing the second firmware update. Alternatively or additionally, the information handling system may receive an update package, such as a Dell Update Package (DUP), containing a plurality of firmware updates for one or more PCI components. The information handling system may begin installation of each of the firmware updates in the package.

At step 506, the information handling system may log components being updated. For example, as firmware updates are being installed, an information handling system may record identifiers for PCI components to which the firmware updates apply, such as PCI-ID device information, in a PCI device reset queue stored in a memory of the information handling system, such as an NVRAM. In some cases, the information handling system may log a component being updated when installation of firmware has reached a point requiring a reboot for application of the update to the component. For example, if multiple firmware updates are received, an information handling system may install the updates as they are received and may record PCI components to which each update applies as installation of each update reaches a point requiring a reboot. Multiple firmware updates may be set for completion of installation at a future reboot, and multiple PCI components running the firmware being updated may be logged in a memory of the information handling system.

An information handling system may also save register settings for components being updated, at step 508. For example, as PCI components being updated are logged in a memory of an information handling system, register settings for the components being updated may also be saved in the memory. Alternatively or additionally, an information handling system may save register settings for all PCI devices after each successful boot.

Some PCI components or PCI component firmware updates may require a system reboot for application of the firmware updates to the components, while others may require a component reset without the need for a reboot. For example, an information handling system that does not support an ACPI driver reset RST method call may require a system reboot to apply firmware updates to PCI components, while a system that does support such functionality may bypass the step of rebooting the system and may reset the components, as described at step 512, without rebooting. At step 510, the information handling system may reboot. For example, a user may instruct the information handling system to reboot to complete installation of one or more updates to firmware for one or more PCI components. In some cases, a user may install multiple PCI firmware updates before instructing the system to reboot, so that multiple PCI components are logged for resetting when the system is rebooted. An information handling system may automatically reboot to complete installation of one or more updates to firmware for one or more PCI components after installation of one or more firmware updates reaches a stage requiring a reboot to complete installation.

At step 512, the information handling system may reset only PCI components that are being updated. In some embodiments, instead of performing a full platform reset, where all PCI components are reset, the information handling system may reset only PCI components that are being updated. In some cases, instead of rebooting, the information handling system may simply reset the PCI components that are being updated. For example, an advanced configuration and power interface (ACPI) driver may call an ACPI machine language (AML) PCI Reset (_RST) method to reset the components with updated firmware, without performing a system reboot. The information handling system may include an updated advanced configuration and power interface (ACPI) BIOS to facilitate resetting of updated PCI components. The information handling system may also include one or more updated PCI drivers, such as PCIe drivers following the ACPI specification 6.2, to allow for resetting of specific PCI components. PCI components that are being updated may require resetting to apply firmware updates that are being installed. However, resetting all PCI devices may require a substantial amount of time, in some cases exceeding ten minutes. If application of the PCI firmware updates requires a reboot, the information handling system may perform a quick boot, as described with respect to FIG. 3, where resetting of PCI devices may be bypassed by default, but may reset PCI components for which firmware updates are being installed, to complete installation of the updates. For example, an ACPI driver may check a PCI device reset queue stored in an NVRAM of the information handling system to determine which PCI components are to be reset. The ACPI driver may inventory PCI configuration space for the devices to be reset. The ACPI driver may then call an AML device reset function, such as an _RST method, resetting each device, and may remove each device from the PCI device reset queue as each device is reset.

At step 514, the information handling system may load stored register settings for the updated PCI devices. For example, the information handling system may restore configurations settings for the reset PCI device. In some embodiments, the information handling system may restore PCI resource allocation and device enablement, from a memory such as an NVRAM, for all PCI components after the components being updated are reset. Updated PCI components may be reset, and register settings for the updated PCI components may be restored from memory, while mappings for PCI components that are not being updated may be restored from memory enabling the non-updated PCI components without requiring a reset. Thus, PCI components for which firmware updates are received may be logged in NVRAM for resetting and reset, reducing the amount of time required to apply the firmware updates.

Figure 6:
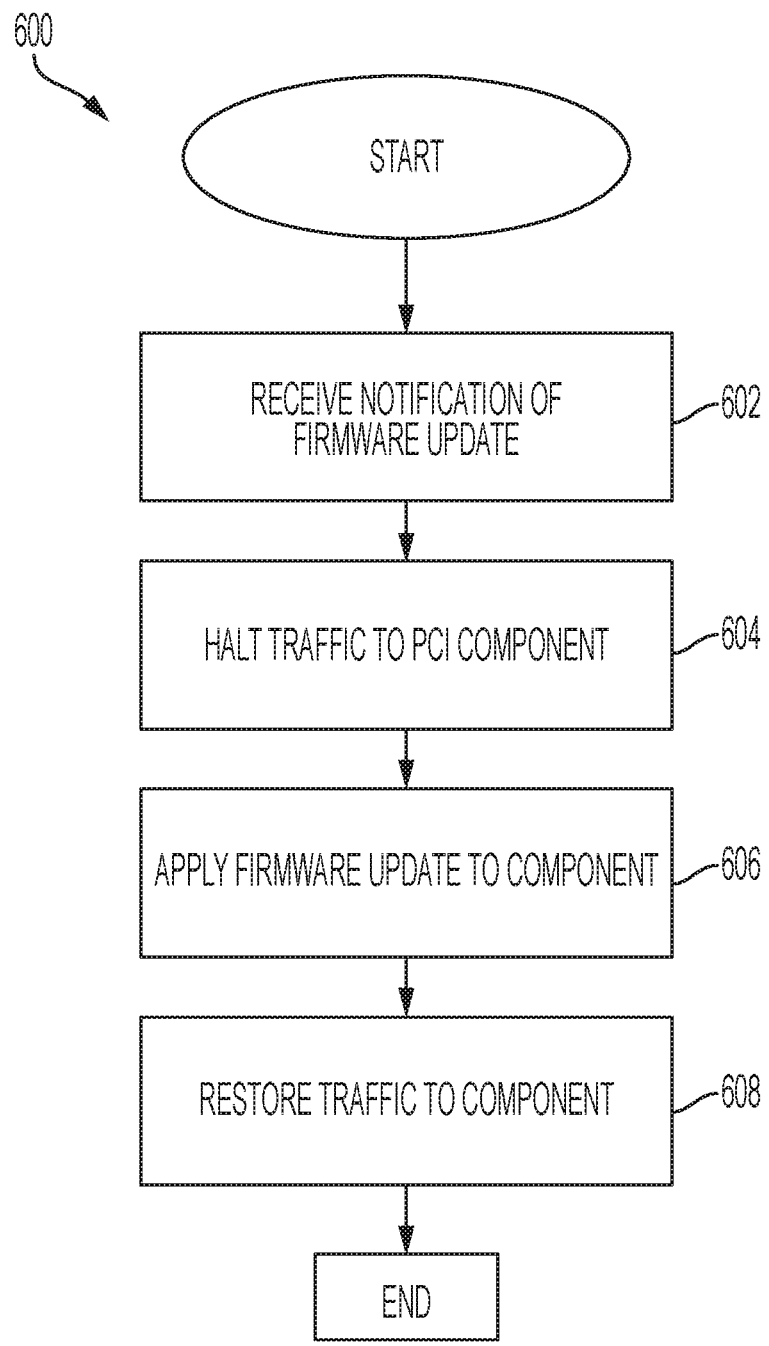
FIG. 6 is a flow chart of an example method for updating PCI component firmware according to some embodiments of the disclosure.

An information handling system may update PCI components from a BMC in an agent-free manner. A method 600 for updating PCI components of an information handling system from a BMC is shown in FIG. 6. The method 600 may begin at step 602 with receipt of a notification of a firmware update. For example, an operating system of an information handling system may receive a notification, via a BIOS of the information handling system, from a BMC that the BMC has received a firmware update.

After the operating system has received the notification of receipt of the update, it may halt traffic to the PCI component at step 604. For example, the information handling system may disable the component so that the firmware update may be installed and applied to the component. In some embodiments, the operating system may store component information, such as register settings and other configuration information for the PCI component, in an NVRAM of the information handling system.

At step 606, the information handling system may apply the firmware update to the component. For example, the operating system of the information handling system may cause the update received by the BMC to be installed and may reset the updated component. After resetting the updated component, the information handling system may restore operation of the component by loading register settings and, in some cases, other configuration information for the PCI component from NVRAM of the information handling system.

In some embodiments, the information handling system may reboot, in order to apply the firmware update to the component, at step 606. For example, when installation of the update reaches a stage requiring a reboot for application of the update to the component, the information handling system may reboot, either based on a user instruction or automatically, in order to apply the firmware update to the PCI component. The reboot may, for example, include a quick boot as described with respect to FIG. 3. For example, a reboot and quick boot may be used to apply a firmware update to a PCI component when the PCI component does not support an ACPI AML RST method for resetting the component and applying firmware at runtime. In some embodiments, a BIOS may apply the firmware update to the PCI component. For example, the BIOS may examine a PCI device reset queue including component identifiers of PCI components to be reset in an NVRAM of the information handling system and may reset the components specified in the device reset queue. In some embodiments, a BIOS may instruct a BMC of the information handling system to apply the update to the component. The information handling system may reset the component to apply the firmware update to the component. After resetting the component, the information handling system may restore operation of the component by loading register settings and, in some cases, other configuration information from the NVRAM of the information handling system. For example, the information handling system may reset the component, load the register settings for the component, and, in some cases, perform a quick boot, as described with respect to FIG. 3.

At step 610, the information handling system may restore traffic to the component. After the information handling system has reset the updated PCI component and restored the components register and configuration settings from NVRAM, the operating system of the information handling system may restore traffic to the component. In some embodiments, such as when application of the firmware update to the component requires a reboot, the information handling system may complete a quick boot process, and, when an operating system of the information handling system is initialized, the operating system may restore operation of the PCI component, running on the updated firmware.

Figure 7:
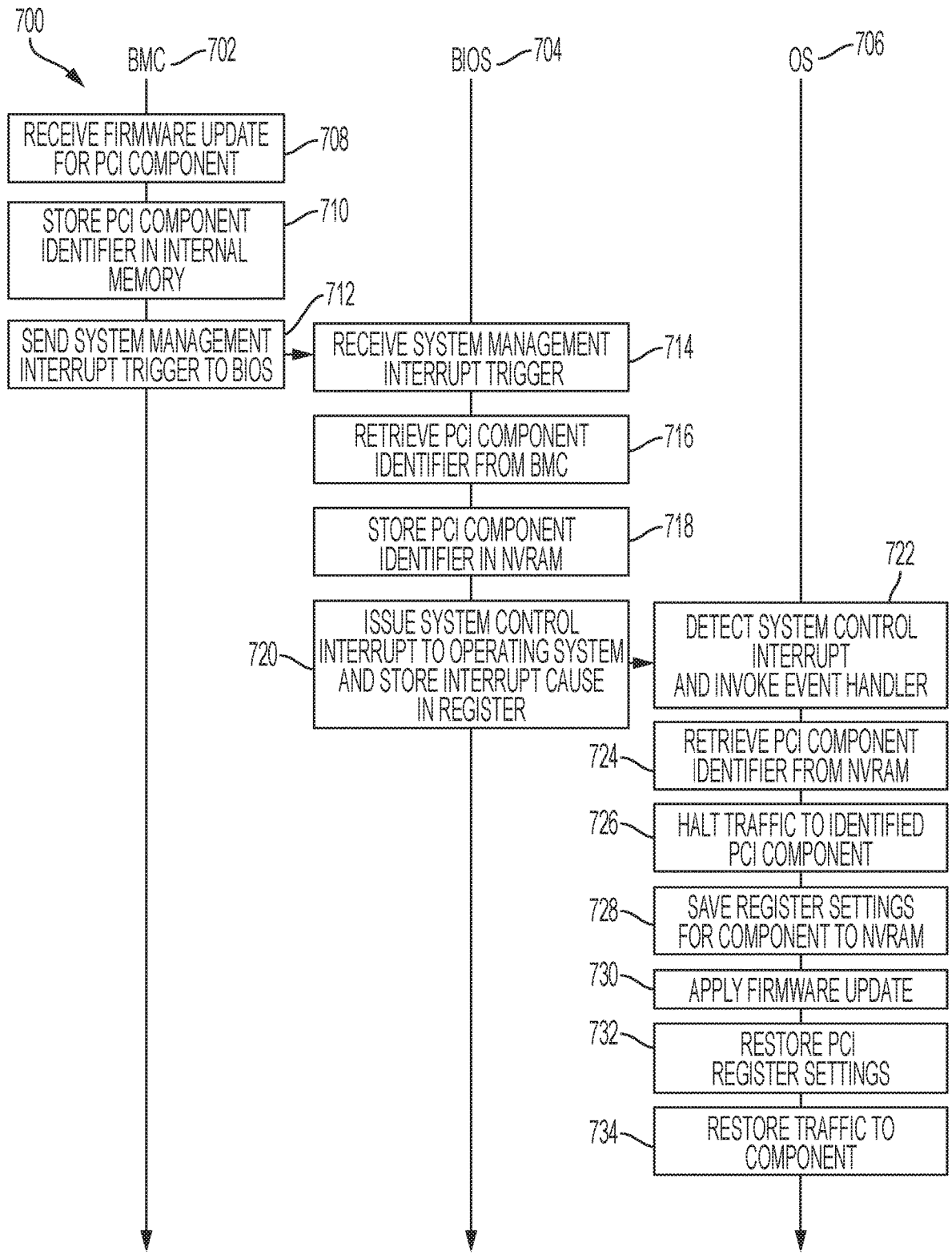
FIG. 7 is a process flow diagram of an example process for updating PCI component firmware from a BMC according to some embodiments of the disclosure.

A BMC, BIOS, and operating system of an information handling system may communicate with each other to facilitate installation of a PCI device firmware update received by the BMC. A process flow diagram 700 of an example process for updating PCI component firmware from a BMC is shown in FIG. 7. The process 700 may begin, at step 708 with receipt of a firmware update for a PCI component by BMC 702. For example, a BMC of an information handling system may receive a firmware update for a PCI component via a network connection, such as an internet connection to a remote server. The BMC 702 may include an iDRAC configured to receive firmware updates, such as Dell Update Packages (DUPs) pushed by a remote server. The BMC 702 may receive the firmware update via a sideband channel. In some embodiments, the BMC 702 may receive the update over the sideband channel in an agent-free manner, without interacting with an operating system 706 of the information handling system. Thus, the operating system 706 may be unaware that the BMC 702 has received the update until it is informed of receipt of the update by the BMC 702. The BMC 702 may maintain a firmware inventory for firmware of PCI components separate from a main system firmware inventory accessible by the operating system 706 of the information handling system.

At step 710, the BMC 702 may store a PCI component identifier for a component associated with the firmware update in a memory of the BMC 702. For example, the BMC may include an internal memory for storage of firmware updates and component information, and both the firmware update and a component identifier identifying the PCI component to which the firmware update applies may be stored in the memory.

At step 712, the BMC 712 may send a system management interrupt (SMI) trigger to a BIOS 704 of the information handling system to inform the BIOS that a firmware update has been received. For example, a complex programmable logic device (CPLD) of the BMC 702 may trigger a signal on a general purpose input/output (GPIO) pin of a platform controller hub (PCH) connected to the BIOS 704 to inform the BIOS 704 that a firmware update has been received.

At step 714, the BIOS 704 may receive the system management interrupt (SMI) trigger from the BMC 702. For example, a BIOS 704 SMI handler may detect the SMI trigger issued by the BMC 702.

At step 716, the BIOS 704 may retrieve the PCI component identifier from the BMC 702. For example, the BIOS 704 may access a memory of the BMC 702 to retrieve the PCI component identifier. Alternatively, the BIOS 704 may request the component identifier from the BMC 702 and the BMC may transmit the component identifier to the BIOS 704. The BIOS SMI handler may query the BMC 702, and in some cases an iDRAC of the BMC 702, to retrieve the PCI component identifier from an internal memory of the BMC 702. The BIOS 704 may utilize a keyboard controller style (KCS) interface to query the BMC 702 for the PCI component identifier and, in some cases, other component data.

At step 718, the BIOS 704 may store the PCI component identifier, retrieved from the BMC, in a memory of the information handling system. For example, the BIOS 704 SMI handler may store the PCI component identifier in a PCI component reset queue of an NVRAM of the information handling system.

At step 720, the BIOS 704 may issue a system control interrupt (SCI) to inform an operating system 706 the information handling system that the BMC has received a firmware update. The BIOS 704 may further store a cause of the SCI in a BIOS register. For example, the BIOS 704 SMI handler may store the cause of the SCI in a scratchpad register of a processor of the information handling system.

At step 722, the operating system 706 of the information handling system may detect the SCI, issued by the BIOS, and may invoke an event handler. For example, the operating system 706 may detect the SCI and may invoke a BIOS ACPI Source Language and/or ACPI Machine Language General Purpose Event handler, such as an ACPI Platform Error Interface, to handle the SCI issued by the BIOS 704 to inform the operating system 706 of the received update. The General Purpose Event handler may include SCI cause logic to issue custom notification code to the ACPI Platform Error Interface and/or Windows Hardware Error Architecture driver to initiate an operating system process for responding to the firmware update received by the BMC 702.

At step 724, the operating system 706 may retrieve the PCI component identifier from the memory of the information handling system. For example, the operating system 706 may retrieve the PCI component identifier from a PCI component reset queue stored in NVRAM of the information handling system. In some embodiments, the operating system 706 Windows Hardware Error Architecture driver called by the event handler may retrieve the PCI component identifier from the NVRAM.

At step 726, the operating system 706 may halt traffic to the identified PCI component. Halting traffic may allow the BIOS 704 and/or the BMC 702 to install the firmware update and apply the updated firmware to the PCI component. For example, an operating system 706 Windows Hardware Error Architecture driver called by the event handler may halt traffic to the identified PCI component. In some embodiments, the operating system 706 may wait until a reboot is requested before halting traffic to the identified PCI component.

At step 728, the operating system 706 may save register settings for the PCI component to a memory, such as an NVRAM, of the information handling system. In some cases, the operating system 706 may save other component configuration parameters to the system memory. For example, the operating system 706 Windows Hardware Error Architecture driver may inventory configuration space settings of the PCI device and may record the settings in the NVRAM. For example, the operating system 706 Windows Hardware Error Architecture driver called by the event handler may halt traffic to the identified PCI component.

At step 730, the operating system may apply the firmware update to the PCI component. For example, the operating system 706 may issue an ACPI AMP PCI Device Reset (_RST) method call from an ACPI driver to reset the component and facilitate application of the firmware update. The operating system 706 may further issue a command to remove the component identifier from the NVRAM, after the update has been applied and the component has been reset.

In some embodiments, the operating system may initiate a reboot in order to apply the firmware update to the PCI component. For example, if the ACPI driver does not support the ACPI RST method call, a platform reset may be required to reset the components. In some embodiments, the information handling system may wait until multiple PCI component firmware updates are ready for application to PCI components before initiating a reboot. For example, the information handling system may wait for a user to initiate a reboot of the information handling system. In other embodiments the information handling system may reboot automatically when an update has reached a stage in installation requiring a component reset to complete installation of the update.

At step 732, the operating system 706, such as the Windows Hardware Error Architecture driver, may then access the PCI component settings stored in the NVRAM of the information handling system, such as register settings, to restore a configuration of the PCI component. For example, the operating system may restore register and/or configuration settings that were stored at step 728. After the settings are restored, the operating system 706 may, at step 734, restore traffic to the PCI component with updated firmware.

In some embodiments, the operating system may initiate a reboot, such as at or preceding step 730, in order to apply the firmware update to the PCI component. In some embodiments, the information handling system may wait until multiple PCI component firmware updates are ready for application to PCI components before initiating a reboot. For example, the information handling system may wait for a user to initiate a reboot of the information handling system.

In other embodiments the information handling system may reboot automatically when an update has reached a stage in installation requiring a component reset to complete installation of the update. While the information handling system is rebooting, the BIOS 704 may apply the firmware update to the information handling system. For example, the information handling system may reboot, and while the information handling system is booting the BIOS may reset the PCI component to apply the firmware update to the component. In some embodiments, the reboot may be a quick boot as described with reference to FIG. 3, and the PCI component being updated may be reset before performing quick boot steps such as restoring PCI resource allocation and device enablement. In some embodiments, the BIOS 704 may direct the BMC 702 to apply the firmware update to the PCI component. The BIOS 704 may restore PCI register settings for the PCI component. In some embodiments the BIOS may restore other configuration settings for the PCI component after the component is reset. For example, the BIOS may retrieve register settings and other configuration settings for the PCI component from an NVRAM of the information handling system. The BIOS 704 may restore operation of PCI components that did not require a firmware update, such as by restoring PCI resource allocations, PCI device enablement settings, and a last known good map, as described with reference to FIG. 3. After the operating system has finished booting, the operating system 706 may restore traffic to the component. For example, if the information handling system is performing a quick boot, the information handling system may finish booting the operating system, and the operating system 706 may restore traffic to the PCI component after it is initialized. Thus, firmware updates to PCI components of an information handling system may be received by a BMC, and an operating system may be notified, via a BIOS, of receipt of the firmware updates to facilitate application of the updates to the components.

The schematic flow chart diagrams of FIGS. 5-6 and the process flow diagram of FIG. 7 are generally set forth as logical flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for updating component firmware, comprising:
   receiving, by an operating system of an information handling system from a basic input/output system (BIOS) of the information handling system, a system control interrupt notifying the operating system that a baseboard management controller (BMC) has received an update for a firmware of a peripheral component interconnect (PCI) component, wherein the system control interrupt is received by the operating system after a system management interrupt is received by the BIOS from the BMC, wherein the system management interrupt notifies the BIOS that the BMC has received the update for the firmware of the PCI component;
   halting traffic to the PCI component by the operating system of the information handling system; and
   applying the firmware update to the PCI component, after the operating system has halted traffic to the PCI component.

2. The method of claim 1, wherein applying the firmware update to the PCI component comprises resetting the PCI component.

3. The method of claim 2, wherein resetting the PCI component comprises calling an Advanced Configuration and Power Interface (ACPI) machine language (AML) PCI Reset (RST) method to reset the PCI component.

4. The method of claim 1, further comprising:
storing, by the BMC, an identifier for the PCI component for which the firmware update is received in a memory of the BMC; and
triggering, by the BMC, the system management interrupt to notify the BIOS of receipt of the firmware update.

5. The method of claim 4, further comprising:
accessing, by the BIOS, the identifier for the PCI component stored in the memory of the BMC;
storing, by the BIOS, the identifier for the PCI component in a non-volatile random access memory (NVRAM) of the information handling system; and
triggering, by the BIOS, the system control interrupt to notify the operating system of receipt of the firmware update.

6. The method of claim 5, further comprising:
accessing, by the operating system, the identifier for the PCI component stored in the NVRAM;
storing register settings for the PCI component specified by the identifier in the NVRAM,
wherein halting traffic to the PCI component comprises halting traffic to the PCI component specified by the identifier in the NVRAM.

7. The method of claim 6, further comprising:
restoring the register settings for the PCI component after applying the firmware update; and
restoring traffic to the PCI component after the firmware update is applied and the register settings are restored.

8. An information handling system comprising:
a baseboard management controller (BMC);
a basic input/output system (BIOS); and
a processor,
wherein the processor is configured to perform steps comprising:
receiving, by an operating system of the information handling system from the BIOS of the information handling system, a system control interrupt notifying the operating system that the BMC has received an update for a firmware of a peripheral component interconnect (PCI) component, wherein the system control interrupt is received by the operating system after a system management interrupt is received by the BIOS from the BMC, wherein the system management interrupt notifies the BIOS that the BMC has received the update for the firmware of the PCI component;
halting traffic to the PCI component by the operating system of the information handling system; and
applying the firmware update to the PCI component, after the operating system has halted traffic to the PCI component.

9. The system of claim 8, wherein the step of applying the firmware update to the PCI component comprises resetting the PCI component.

10. The system of claim 9, wherein resetting the PCI component comprises calling an Advanced Configuration and Power Interface (ACPI) machine language (AML) PCI Reset (RST) method to reset the PCI component.

11. The system of claim 8, wherein the BMC is configured to perform steps comprising:
storing, by the BMC, an identifier for the PCI component for which the firmware update is received in a memory of the BMC; and
triggering, by the BMC, the system management interrupt to notify the BIOS of receipt of the firmware update.

12. The system of claim 11, wherein the BIOS is configured to perform steps comprising:
accessing, by the BIOS, the identifier for the PCI component stored in the memory of the BMC;
storing, by the BIOS, the identifier for the PCI component in a non-volatile random access memory (NVRAM) of the information handling system; and
triggering, by the BIOS, the system control interrupt to notify the operating system of receipt of the firmware update.

13. The system of claim 12, wherein the processor is configured to perform steps comprising:
accessing, by the operating system, the identifier for the PCI component stored in the NVRAM;
storing register settings for the PCI component specified by the identifier in the NVRAM,
wherein halting traffic to the PCI component comprises halting traffic to the PCI component specified by the identifier in the NVRAM.

14. The system of claim 13, wherein the processor is further configured to perform steps comprising:
restoring the register settings for the PCI component after applying the firmware update; and
restoring traffic to the PCI component after the firmware update is applied and the register settings are restored.

15. A computer program product, comprising:
a non-transitory computer readable medium comprising instructions to cause a processor to perform steps comprising:
receiving, by an operating system of an information handling system from a basic input/output system (BIOS) of the information handling system, a system control interrupt notifying the operating system that a baseboard management controller (BMC) has received an update for a firmware of a peripheral component interconnect (PCI) component, wherein the system control interrupt is received by the operating system after a system management interrupt is received the BIOS from the BMC, wherein the system management interrupt notifies the BIOS that the BMC has received the update for the firmware of the PCI component;
halting traffic to the PCI component by the operating system of the information handling system; and
applying the firmware update to the PCI component, after the operating system has halted traffic to the PCI component.

16. The computer program product of claim 15, wherein the step of applying the firmware update to the PCI component comprises resetting the PCI component.

17. The computer program product of claim 16, wherein resetting the PCI component comprises calling an Advanced Configuration and Power Interface (ACPI) machine language (AML) PCI Reset (_RST) method to reset the PCI component.

18. The computer program product of claim 15, wherein the non-transitory computer readable medium further comprises instructions to cause the processor to perform steps comprising:
storing, by the BMC, an identifier for the PCI component for which the firmware update is received in a memory of the BMC; and
triggering, by the BMC, the system management interrupt to notify the BIOS of receipt of the firmware update.

19. The computer program product of claim 18, wherein the non-transitory computer readable medium further comprises instructions to cause the processor to perform steps comprising:

accessing, by the BIOS, the identifier for the PCI component stored in the memory of the BMC;

storing, by the BIOS, the identifier for the PCI component in a non-volatile random access memory (NVRAM) of the information handling system; and triggering, by the BIOS, the system control interrupt to notify the operating system of receipt of the firmware update.

20. The computer program product of claim 19, wherein the non-transitory computer readable medium further comprises instructions to cause the processor to perform steps comprising:

accessing, by the operating system, the identifier for the PCI component stored in the NVRAM;

storing register settings for the PCI component specified by the identifier in the NVRAM, wherein halting traffic to the PCI component comprises halting traffic to the PCI component specified by the identifier in the NVRAM.

* * * * *